(12) United States Patent
Shokawa

(10) Patent No.: US 8,874,155 B2
(45) Date of Patent: Oct. 28, 2014

(54) BASE STATION DEVICE, AND CONTROL METHOD AND PROGRAM THEREOF

(75) Inventor: Takashi Shokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 282 days.

(21) Appl. No.: 13/256,707

(22) PCT Filed: Apr. 13, 2010

(86) PCT No.: PCT/JP2010/002672
§ 371 (c)(1),
(2), (4) Date: Sep. 15, 2011

(87) PCT Pub. No.: WO2010/137227
PCT Pub. Date: Dec. 2, 2010

(65) Prior Publication Data
US 2012/0021789 A1 Jan. 26, 2012

(30) Foreign Application Priority Data
May 26, 2009 (JP) ................................. 2009-126803

(51) Int. Cl.
*H04W 24/02* (2009.01)
*H04W 88/08* (2009.01)

(52) U.S. Cl.
CPC .............. *H04W 24/02* (2013.01); *H04W 88/08* (2013.01)
USPC ....................................................... 455/507

(58) Field of Classification Search
CPC ..... H04W 24/00; H04W 56/00; H04W 24/02; H04W 88/08
USPC ....................................................... 455/507
See application file for complete search history.

(56) References Cited

U.S. PATENT DOCUMENTS

| 2006/0190585 A1* | 8/2006 | Shokawa | 709/223 |
| 2006/0248500 A1* | 11/2006 | O'Donoghue | 717/100 |
| 2007/0143612 A1* | 6/2007 | Brown et al. | 713/171 |

(Continued)

FOREIGN PATENT DOCUMENTS

| JP | 2004334832 A | 11/2004 |
| JP | 2005210591 A | 8/2005 |
| JP | 2008000950 A | 3/2008 |
| JP | 2008193525 A | 8/2008 |

OTHER PUBLICATIONS

International Search Report for PCT/JP2010/002672 mailed Jun. 1, 2010.

*Primary Examiner* — Bobbak Safaipour
(74) *Attorney, Agent, or Firm* — Sughrue Mion, PLLC

(57) ABSTRACT

In order to certainly acquire configuration information at the time of first startup, an evaluation unit (10) forming a base station device (1) evaluates whether or not the base station device (1) is started up for the first time based on a connection status of associated equipments (2_1 to 2_n). At this time, when one or more associated equipments connected to the base station device (1) include the associated equipment which should be connected at the time of the first startup and also does not include the associated equipment which should not be connected at the time of the first startup, the evaluation unit (10) evaluates that it is the first startup, and in other cases, evaluates that it is not the first startup. Further, when the evaluation unit (10) evaluates that it is the first startup, an acquisition unit (20) acquires configuration information (102) necessary for operations of the base station device (1) from a server (3).

5 Claims, 5 Drawing Sheets

(56) References Cited

U.S. PATENT DOCUMENTS

2008/0222448 A1* 9/2008 Nash et al. .................. 714/2
2009/0024996 A1* 1/2009 Shokawa .................. 718/100
2009/0310889 A1* 12/2009 Matsushima et al. ......... 382/305
2010/0189057 A1* 7/2010 Nago .......................... 370/329
2011/0178977 A1* 7/2011 Drees ............................. 706/52
2011/0242361 A1* 10/2011 Kuwahara et al. ......... 348/231.4

* cited by examiner

LIST FOR EVALUATION L1

| ASSOCIATED EQUIPMENT | CONNECTION CONDITION |
|---|---|
| ANTENNA 2_1 | ○ (CONNECTED) |
| MAINTENANCE TERMINAL 2_2 | ○ |
| DEBUGGING TOOL 2_3 | × (NOT CONNECTED) |
| OTHER ASSOCIATED EQUIPMENT 2_4 | ○ |

Fig. 3

DETECTED EQUIPMENT LIST L2

| ASSOCIATED EQUIPMENT | DETECTION RESULT |
|---|---|
| ANTENNA 2_1 | ○ (DETECTED) |
| MAINTENANCE TERMINAL 2_2 | ○ |
| DEBUGGING TOOL 2_3 | × (NOT DETECTED) |
| OTHER ASSOCIATED EQUIPMENT 2_4 | ○ |
| OTHER ASSOCIATED EQUIPMENT 2_5 | ○ |

Fig. 5A

DETECTED EQUIPMENT LIST AFTER FILTERING L2

| ASSOCIATED EQUIPMENT | DETECTION RESULT |
|---|---|
| ANTENNA 2_1 | ○ |
| MAINTENANCE TERMINAL 2_2 | ○ |
| DEBUGGING TOOL 2_3 | × |
| OTHER ASSOCIATED EQUIPMENT 2_4 | ○ |

Fig. 5B

BASE STATION DEVICE, AND CONTROL METHOD AND PROGRAM THEREOF

TECHNICAL FIELD

The present invention relates to a base station device, and control method and program thereof, and particularly to a base station device that acquires (downloads) configuration information necessary for operations from a server at the time of first startup, and control method and program thereof.

BACKGROUND ART

A base station device as the one above is disclosed in, for example, PTL 1. The base station device disclosed in PTL 1 downloads configuration information concerning an installed position of the base station device itself and the like from a server at the time of new installment (in other words, at the time of first startup), thereby using the configuration information for subsequent operations.

CITATION LIST

Patent Literature

PTL 1: Japanese Unexamined Patent Application Publication No. 2008-193525

SUMMARY OF INVENTION

Technical Problem

However, in the above PTL 1, there is an issue that the configuration information may not be acquired at the time of first startup of the base station device due to an error in operation by an operator or the like. This is because the operator needs to switch whether it is first startup or not by using a physical switch, or to change configuration by using specialized software.

There is also a problem of increasing the cost of the base station device in the installment of the physical switch. On the other hand, there is also a problem of complicating the operator's work in the configuration change using the specialized software.

Therefore, an object of the present invention is to provide a base station device that can certainly acquire configuration information at the time of first startup, and control method and program thereof.

Solution to Problem

In order to achieve the above object, an exemplary aspect of the present invention is a base station device that includes an evaluation means that evaluates whether or not the device itself is started up for a first time based on a connection status of an associated equipment, and an acquisition means that acquires configuration information necessary for an operation of the device itself when evaluated that it is the first startup.

Further, an exemplary aspect of the present invention is a control method for a base station device. This control method includes evaluating whether or not the base station is started up for a first time based on a connection status of an associated equipment, and acquiring configuration information necessary for an operation of the base station device from a server when evaluated that it is the first startup.

Furthermore, an exemplary aspect of the present invention is a control program for causing a base station device to execute a process to evaluate whether the base station device is started up for a first time based on a connection status of an associated equipment, and a process to acquire configuration information necessary for an operation of the base station device from a server when evaluated that it is the first startup.

Advantageous Effects of Invention

According to the present invention, the base station device itself autonomously evaluates the first startup. Therefore, it is possible to certainly acquire the configuration information without depending on the operator's operation. Further, as the first startup is evaluated based on the connection status of the associated equipment, there are exemplary advantages that the above-mentioned installment of the physical switch and the configuration change using the specialized software will be unnecessary, and thereby it is possible to attempt cost reduction of the base station device and higher efficiency of the operator's work.

BRIEF DESCRIPTION OF DRAWINGS

FIG. 3 is a view showing a configuration example of a list for evaluation used for the base station device according to the exemplary embodiment of the present invention;

FIG. 5A is a view showing a creation example of a detected equipment list used for the base station device according to the exemplary embodiment of the present invention; and FIG. 5B is a view showing a filter example of the detected equipment list used for the base station device according to the exemplary embodiment of the present invention.

DESCRIPTION OF EMBODIMENTS

Hereinafter, an exemplary embodiment of a base station device according to the present invention will be described with reference to FIGS. 1 to 4, 5A, and 5B. Note that in each drawing, the same numerals are given to the same components, and duplicate explanation is omitted as necessary for the clarity of the explanation.

Figure 1:
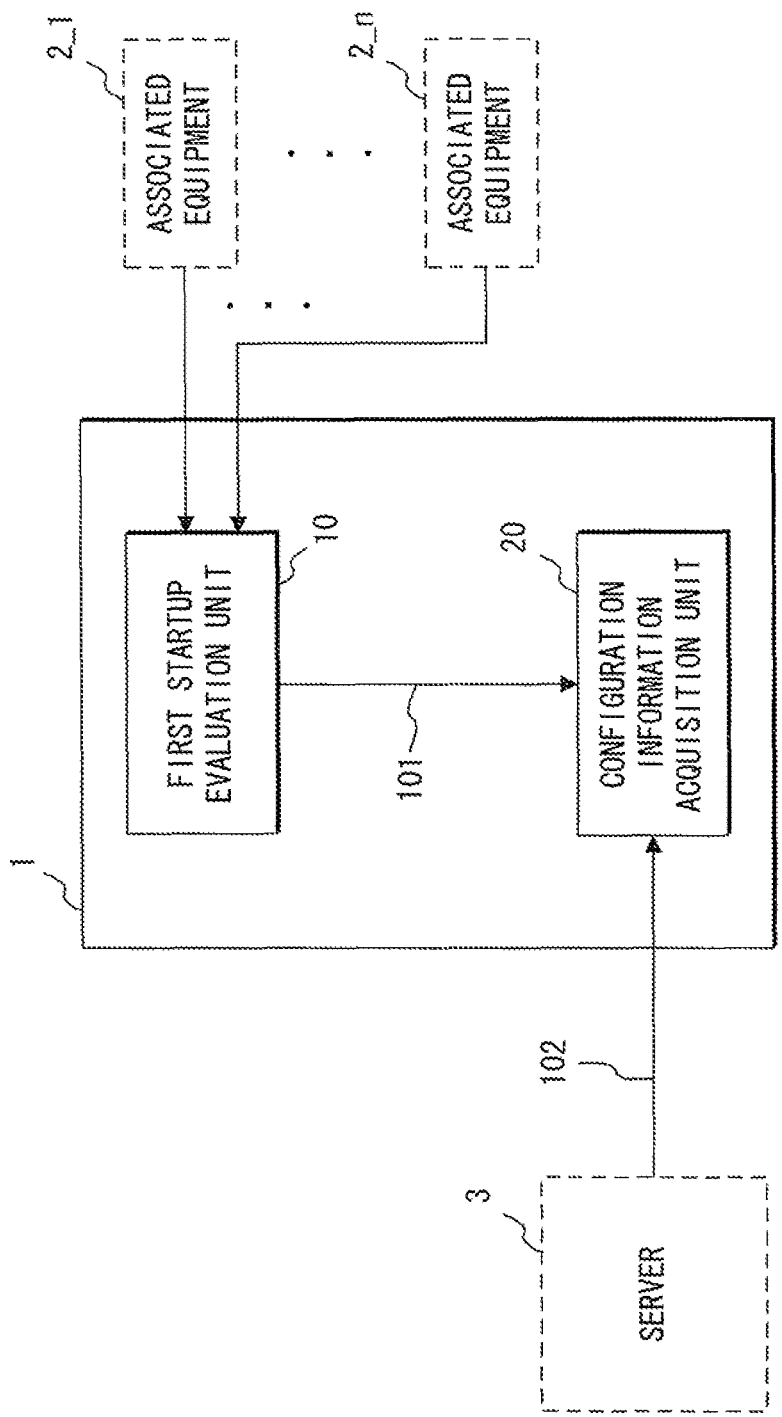
FIG. 1 is a block diagram showing a schematic configuration example of a base station device according to an exemplary embodiment of the present invention.

A base station device 1 shown in FIG. 1 according to this exemplary embodiment is composed of a first startup evaluation unit 10 and a configuration information acquisition unit 20.

Among them, the first startup evaluation unit 10 detects the connection status (existence of connection) of associated equipments 2_1 to 2_n to the base station device 1 at the time of power up, and evaluates whether the base station device 1 is started up for the first time based on the connection status (details of this evaluation process will be described later). The associated equipments 2_1 to 2_n include various equipments that can be connected to the base station device 1 such as an antenna used for transmission and reception of wireless signals with a mobile terminal, a maintenance terminal used by an operator, a debugging tool for operation analysis, and a safety device (a cooling device, a fire alarm, or the like).

On the other hand, when an evaluation result 101 output from the first startup evaluation unit 10 indicates "first startup", the configuration information acquisition unit 20 downloads configuration information 102 necessary for the operation of the base station device 1 from a server 3. The configuration information 102 includes various system parameters such as frequency information used for wireless communication with the mobile terminal.

In this way, in this exemplary embodiment, the base station device 1 itself autonomously evaluates the first startup, and thus can certainly acquire the configuration information 102 without depending on the operator's operation.

Hereinafter, specific configuration example and operation example of the base station device 1 are described in detail with reference to FIGS. 2 to 4, and FIGS. 5A and 5B.

Figure 2:
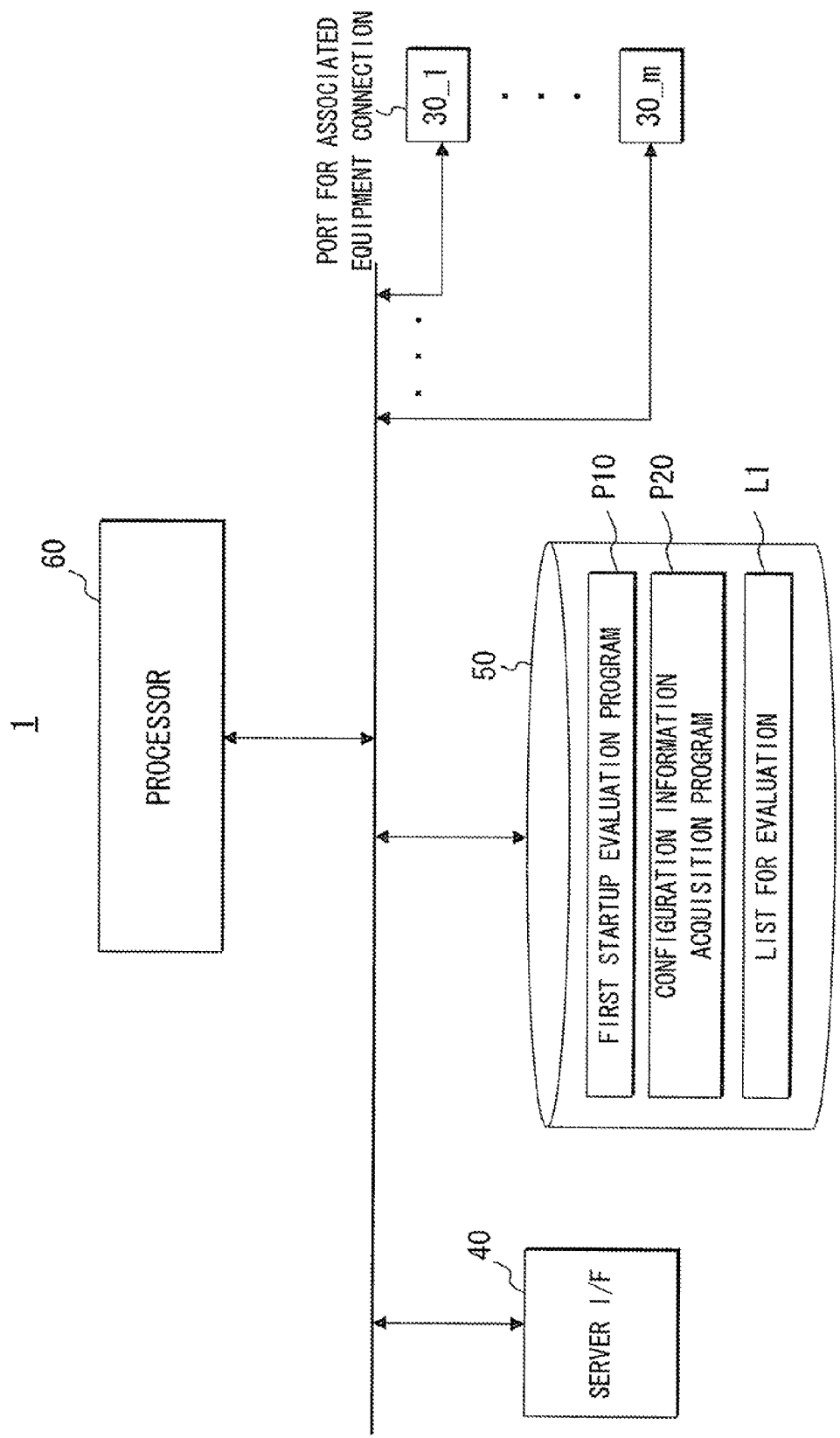
FIG. 2 is a block diagram showing a specific configuration example of the base station device according to the exemplary embodiment of the present invention.

As shown in FIG. 2, it is preferable that the base station device 1 is composed of ports 30_1 to 30_m (hereinafter may be collectively referred to as a numeral 30) for connecting the associated equipments 2_1 to 2_n, a server I/F 40 that functions as an interface with the server 3, a storage medium 50, and a processor 60. Note that these blocks 30 to 60 are mutually connected via a bus or the like. Further, it is satisfied that the number "m" of ports≤the number "n" of associated equipments which can be connected to the base station device 1. Accordingly, each of the ports 30_1 to 30_m may be able to connect only a particular associated equipment or may alternatively be able to connect some associated equipments.

Furthermore, the storage medium 50 stores a first startup evaluation program P10 and a configuration information acquisition program P20 which are executed by the processor 60, and a list L1 for evaluation, which is referred at the time of execution of the first startup program P10.

Among these, in the first startup evaluation program P10, the process corresponding, to the first startup evaluation unit 10 shown in FIG. 1 is described. On the other hand, in the configuration information acquisition program P20, the process corresponding to the configuration information acquisition unit 20 is described.

Moreover, to the list L1 for evaluation, necessary associated equipments that should be connected at the time of first startup of the base station device 1 and unnecessary associated equipments that should not be connected at the time of first startup are preliminarily registered. More specifically, for example as shown in FIG. 3, an antenna 2_1, a maintenance terminal 2_2, a debugging tool 2_3, and other associated equipment 2_4 are registered to the list L1 for evaluation. Additionally, as a connection condition for each of the antenna 2_1, the maintenance terminal 2_2, and other associated equipment 2_4, while an indication ("O" in the drawing) that the connection at the time of first startup is necessary is designated, as a connection condition for the debugging tool 2_3, an indication ("X" in the drawing) that the connection at the time of first startup is unapproved is designated.

Next, an operation of the base station device 1 is explained with reference to FIGS. 4, 5A, and 5B.

Figure 4:
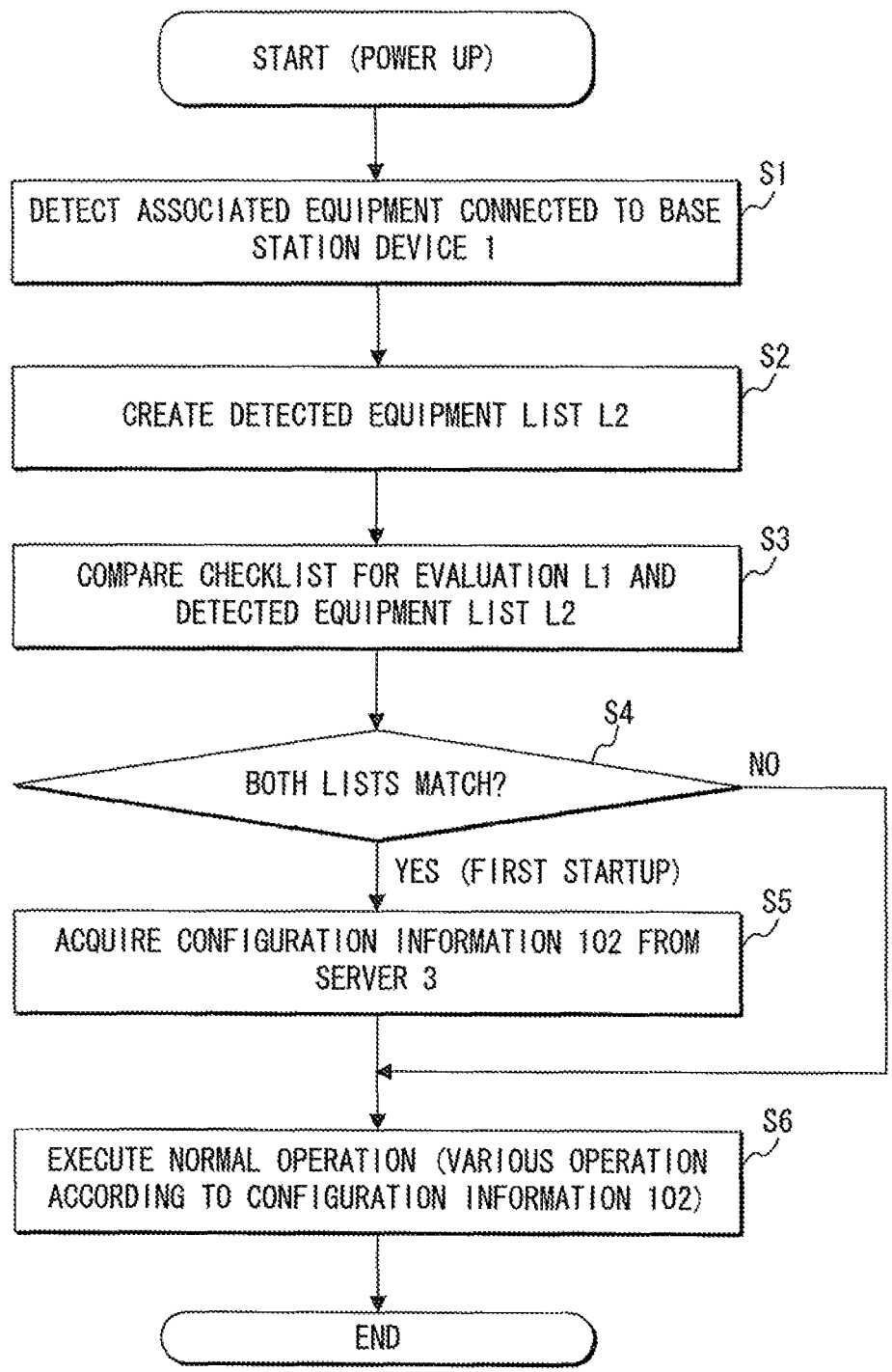
FIG. 4 is a flowchart showing an operation example of the base station device according to the exemplary embodiment of the present invention.

As shown in FIG. 4, when the base station device 1 is powered up, the processor 60 firstly reads and executes the first startup evaluation program P10 from the storage medium 50. The first startup evaluation program P10 detects the associated equipment connected to the base station device 1 (step S1). More specifically, as for the port that can connect only the particular associated equipment, the first startup evaluation program P10 detects the associated equipment by the conduction via the port. On the other hand, as for the port that can alternately connect to some associated equipments, the first startup evaluation program P10 detects the associated equipments by the communication via the port.

Then, as shown in FIG. 5A, the first startup evaluation program P10 creates a list L2 of the associated equipments detected at the above step S1 (hereinafter referred to as a detected equipment list) (step S2). In the example of the drawing, an indication ("O" in the drawing) that the connection of the antenna 2_1, the maintenance terminal 2_2, and other associated equipments 2_4 and 2_5 is detected, and an indication ("X" in the drawing) that the connection of the debugging tool 2_3 is not detected are registered to the detected equipment list L2.

After that, the first startup evaluation program P10 compares the list L1 for evaluation read from the storage medium 50 with the detected equipment list L2 created at the above step S2 (step S3). Upon the comparison, the first startup evaluation program P10 filters (deletes) records concerning the associated equipments not included in the list L1 for evaluation among records in the detected equipment list L2. At this time, other associated equipment 2_5 is not included in the list L1 for evaluation. Therefore, as shown in FIG. 5B, the records concerning the antenna 2_1, the maintenance terminal 2_2, the debugging tool 2_3, and other associated equipment 2_4 remain in the detected equipment list L2 after filtering.

As a result, when the list L1 for evaluation and the detected equipment list L2 completely match, the first startup evaluation program P10 evaluates that the base station device 1 is started up for the first time, and returns a return value indicating thereof to the processor 60 (step S4).

The processor 60 reads and executes the configuration information acquisition program P20 from the storage medium 50. The configuration information acquisition program P20 downloads the configuration information 102 from the server 3 via the server I/F 40 (step S5).

Then, the processor 60 performs various operations (hereinafter referred to as normal operation) according to the configuration information 102 (step S6). More specifically, the processor 60 controls a wireless transceiver (not shown) or the like, thereby realizing wireless communication between the base station device 1 and the mobile terminal.

On the other hand, when the list L1 for evaluation and the detected equipment list L2 do not match at the above step S4, the first startup evaluation program P10 evaluates that it is not the first startup (it is a startup after acquiring the configuration information). In this case, the processor 60 progresses to the above step S6 without executing the configuration information acquisition program P20, thereby executing the normal operation.

Accordingly, it is possible to avoid redundant download of the configuration information 102. Further, in a case where the configuration information 102 is changed in process of the normal operation, it is possible to prevent the changed configuration information from being overwritten (initialized).

Note that the present invention is not limited to the above exemplary embodiment, but it is clear that various changes can be made by the person skilled in the art according to the description of the scope of the claims.

The above programs (the first startup evaluation program P10 and the configuration information acquisition program P20) can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (erasable PROM), flash ROM, RAM (random access memory), etc.). Moreover, the above programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Japanese Patent Application No. 2009-126803 filed on May 26, 2009, the disclosure of which is incorporated herein in its entirety by reference.

INDUSTRIAL APPLICABILITY

The present invention is applied to a base station device, and control method and program thereof, and particularly to a base station device that acquires (downloads) configuration information necessary for operations from a server at the time of first startup, and control method and program thereof.

REFERENCE SIGNS LIST

1 Base Station Device
2_1-2_n Associated Equipment
3 Server
10 First Startup Evaluation Unit
20 Configuration Information Acquisition Unit
30_1-30_m Port for Associated Equipment Connection
40 Server I/F
50 Storage Medium
60 Processor
101 Evaluation Result
102 Configuration Information
L1 List for Evaluation
L2 Detected Equipment List
P10 First Startup Evaluation Program
P20 Configuration Information Acquisition Program

The invention claimed is:

1. A base station device comprising:
an evaluation unit that evaluates whether or not the device itself is started up for a first time based on a connection status of an associated equipment; and
an acquisition unit that acquires configuration information necessary for an operation of the device itself from a server when evaluated that it is the first startup,
wherein the evaluation unit evaluates that it is the first startup when one or more associated equipments connected to the device itself include the associated equipment which should be connected at the time of the first startup and does not include the associated equipment which should not be connected at the time of the first startup, and evaluates that it is not the first startup in other cases, and
wherein the associated equipments, which should be connected at the time of the first startup, include an equipment that is not necessary for the device itself to perform operations according to the configuration information.

2. The base station device according to claim 1, wherein the acquisition unit does not acquire the configuration information when evaluated that it is not the first startup.

3. A method of controlling a base station device, the method comprising:
evaluating whether or not the base station is started up for a first time based on a connection status of an associated equipment;
acquiring configuration information necessary for an operation of the base station device from a server when evaluated that it is the first startup; and
evaluating that it is the first startup when one or more associated equipments connected to the base station device include the associated equipment which should be connected at the time of the first startup and does not include the associated equipment which should not be connected at the time of the first startup, and evaluating that it is not the first startup in other cases,
wherein the associated equipments, which should be connected at the time of the first startup, include an equipment that is not necessary for the base station device to perform operations according to the configuration information.

4. The method according to claim 3, wherein when evaluated that it is not the first startup, the configuration information is not acquired.

5. A non-transitory computer readable medium storing a control program for causing a base station device to execute:
a process to evaluate whether the base station device is started up for a first time based on a connection status of an associated equipment;
a process to acquire configuration information necessary for an operation of the base station device from a server when evaluated that it is the first startup; and
a process to evaluate that it is the first startup when one or more associated equipments connected to the base station device include the associated equipment which should be connected at the time of the first startup and does not include the associated equipment which should not be connected at the time of the first startup, and to evaluate that it is not the first startup in other cases,
wherein the associated equipments, which should be connected at the time of the first startup, include an equipment that is not necessary for the base station device to perform operations according to the configuration information.

* * * * *